United States Patent [19]

Müller

[11] 4,100,156
[45] Jul. 11, 1978

[54] CHLORINE-CONTAINING DISAZA PIGMENTS

[75] Inventor: Paul Müller, Basel, Switzerland

[73] Assignee: Ciba-Geigy Corporation, Ardsley, N.Y.

[21] Appl. No.: 531,028

[22] Filed: Dec. 9, 1974

[30] Foreign Application Priority Data

Dec. 20, 1973 [CH] Switzerland .............. 17900/73

[51] Int. Cl.² ............... C09B 31/12; C09B 33/04; C09B 35/06; C09B 43/00
[52] U.S. Cl. ................ 260/174; 106/23; 106/288 Q; 106/193 P; 260/37 R; 260/37 N; 260/37 NP; 260/37 P; 260/37 PC; 260/39 P; 260/39 SB; 260/42.21; 260/177; 260/184; 260/187; 260/188
[58] Field of Search .......... 260/174, 177, 184, 188, 260/187

[56] References Cited

U.S. PATENT DOCUMENTS

| 1,183,378 | 5/1916 | Heidenreich | 260/184 |
| 1,819,103 | 8/1931 | Laska et al. | 260/184 |
| 1,915,461 | 6/1933 | Zitscher | 260/184 X |
| 1,944,539 | 1/1934 | Zitscher et al. | 260/184 X |
| 2,741,656 | 4/1956 | Schmid | 260/160 |
| 3,562,249 | 2/1971 | Schnabel et al. | 260/184 |

FOREIGN PATENT DOCUMENTS

| 921,223 | 12/1954 | Fed. Rep. of Germany | 260/174 |
| 61,580 | 5/1968 | Fed. Rep. of Germany | 260/174 |
| 43-17306 | 7/1968 | Japan | 260/184 |
| 6,410,631 | 5/1965 | Netherlands | 260/177 |
| 434,520 | 10/1967 | Switzerland | 260/174 |
| 1,058,749 | 2/1967 | United Kingdom | 260/177 |

Primary Examiner—Daniel E. Wyman
Assistant Examiner—John J. Doll
Attorney, Agent, or Firm—Vincent J. Cavalieri

[57] ABSTRACT

Disazo pigments of the formula

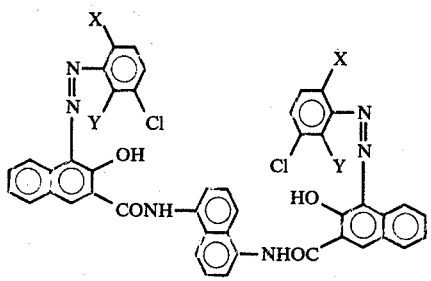

wherein X represents hydrogen or chlorine and Y represents hydrogen or methyl, with X representing chlorine if Y represents hydrogen and X representing hydrogen if Y represents methyl are prepared. The compounds may be used for pigmenting organic materials such as ethyl cellulose, polyesters, and polyvinyl chloride. The compounds have outstanding fastness to light and migration, and good resistance to heat.

1 Claim, No Drawings

CHLORINE-CONTAINING DISAZA PIGMENTS

The present invention provides useful new disazo pigments of the formula

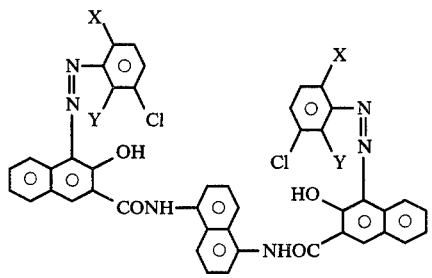

wherein X represents a hydrogen or a chlorine atom and Y represents a hydrogen atom or a methyl group, with X representing a chlorine atom if Y represents a hydrogen atom and X representing a hydrogen atom if Y represents a methyl group. The disazo pigments according to the invention are obtained by (a) condensing a carboxylic acid halide of the formula

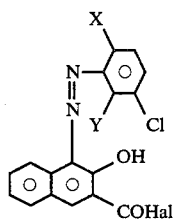

wherein Hal represents a halogen atom, with 1,5-diaminonaphthalene in the molar ratio 2:1, or
(b) coupling the diazo compound of an amine of the formula

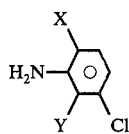

with the bis-naphthol of the formula

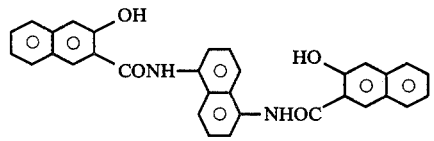

in the molar ratio 2:1.

The azo dyestuff carboxylic acids on which the acid halide used as staring material is based, are obtained by coupling diazotised 2,5-dichloroaniline or, in particular, 2-methyl-3-chloroaniline, with 2,3-hydroxynaphthoic acid.

The azo dyestuff carboxylic acids obtained are treated with agents which are able to convert carboxylic acids into their halides, e.g. the chlorides or bromides, in particular with phophoric halides, for example phosphorus pentachloride or phosphorus trichloride or phosphorus pentabromide, phosphoroxy halides, and preferably, with thiobyl chloride.

The treatment with such acid halogenating agents is carried out for practical reasons in inert solvents, such as dimethyl formamide, chlorobenzenes, such as monochloro- or dichlorobenzene, toluene, xylene or nitrobenzene; in the case of the five last mentioned solvents, dimethyl formamide is optionally added. In the manufacture of the carboxylic acid halides, it is generally advantageous first to dry the azo compound manufactured in aqueous medium or to remove water from it as an azeotrope by boiling it in an organic solvent. If desired, the azeotropic drying can be effected immediately before the treatment with the acid halogenating agents.

The condensation of the carboxylic acid halides of the kind mentioned at the outset and the 1,5-diaminonaphthalene is expediently carried out in anhydrous medium. The condensation takes place at temperatures which are in the boiling range of normal organic solvents, for example, toluene, monochlorobenzene, dichlorobenzene, trichlorobenzene or nitrobenzene. In order to hasten the reaction it is in general advisable to use an acid acceptor, for example anhydrous sodium acetate or pyridine. The resultant pigments are partly crystalline and partly amorphous and are obtained in most cases in very good yield and in a pure state. It is desirable to first precipitate the acid chlorides obtained from the carboxylic acid. In many cases, however, precipitation of the acid chloride can without detriment be dispensed with and the condensation carried out directly after the manufacture of the carboxylic acid chlorides.

The coupling according to embodiment (b) of the process according to the invention is effected desirably by gradual addition of the aqueous alkaline solution of the coupling component to the acid solution of the diazonium salt. The amount of alkali hydroxide to be used for dissolving the coupling component is appropriately so chosen that it suffices to neutralise the mineral acid liberated from the diazonium salt during coupling. The coupling is advantageously carried out at a pH from 4 to 6. The pH is advantageously adjusted by adding a buffer. Possible buffers are, for example, the salts, especially alkali salts, of formic acid, phosphoric acid or, in particular, acetic acid. The alkaline solution of the coupling component desirably contains a wetting agent, a dispersing agent or an emulsifier, for example an aralkylsulphonate, such as dodecylbenzenesulphonate, or the sodium salt of 1,1'-naphthylmethanesulphonic acid, polycondensation products of alkylene oxides, for example the reaction product of ethylene oxide and p-tert.-octylphenol, and also alkyl esters of sulphoricinoleates, for example n-butyl sulphoricinoleate. The dispersion of the coupling component can also advantageously contain protective colloids, for example, methylcellulose, or minor amounts of inert organic solvents which are sparingly soluble or insoluble in water, for example optionally halogenated or nitrated aromatic hydrocarbons, for example, benzene, toluene, xylene, chlorobenzene, dichlorobenzenes or nitrobenzene, and also aliphatic halogenated hydrocarbons, for example, carbon tetrachloride or trichlorethylene, and furthermore organic solvents which are miscible with water, for example, acetone, ethylene glycol monomethyl ether, methyl ethyl ketone, methanol, ethanol or isopropanol.

The coupling can also advantageously be carried out by continuously combining an acid solution of the diazonium salt with an alkaline solution of the coupling component in a mixing nozzle, whereupon an immediate coupling of the component occurs. Care must be taken that the diazo component and the coupling component are present in equimolecular amounts in the mixing nozzle, but a small surplus of coupling component proves to be advantageous. This is most simply accomplished by controlling the pH of the liquid in the mixing nozzle. It is also necessary to ensure that there is an intense turbulent mixing of the two solutions in the mixing nozzle. The resultant dyestuff dispersion is continuously withdrawn from the mixing nozzle and the dyestuff is isolated by filtration.

Finally, it is also possible to effect the coupling by suspending the amine to be diazotised with the coupling component in the molar ratio 2:1 in an organic solvent and treating the coupling mixture with a diazotising agent, in particular an ester of nitric acid, such as methyl, ethyl, butyl, amyl or ethyl nitrite. Owing to their insolubility, the resultant pigments can be isolated from the reaction mixtures by filtering them off. Since the by-products remain in solution, the pigments are obtained in outstanding purity. An after-treatment with an organic solvent is indicated in the case of pigments which have been obtained by the aqueous coupling method. Further advantages of the process according to the invention are the high yield in which the pigments are obtained, their advantageous form from the point of view of pigment technology, and the constancy of their properties.

The new colouring materials constitute useful red pigments which, in finely divided form, may be used for pigmenting organic material of high molecular weight, for example cellulose ethers and esters, e.g. ethyl cellulose, nitrocellulose, cellulose acetate, cellulose butyrate, polyamides, polyurethanes or polyesters, natural resins or artificial resins, such as polymerisation or condensation resins, for example aminoplasts, in particular urea and melamine/formaldehyde resins, alkyd resins, phenolic plastics, polycarbonates, polyolefines, such as polystyrene, polyvinyl chloride, polyethylene, polypropylene, polyacrylonitrile, polyacrylic esters, rubber, casein, silicon and silicon resins, individually or in mixtures.

It is immaterial whether the cited materials o high molecular weight are in the form of plastics, melts or in the form of spinning solutions, lacquers, paints or printing inks. Depending on the use to which they are put, it is advantageous to use the new pigments are toners or in the form of preparations.

The colourations obtained with the pigments according to the invention are characterised by great colour strength and brilliance, good hiding power, outstanding fastness to light and migration and good resistance to heat. The colourations are also free from dichroism.

The following Examples illustrate the invention, the parts and percentages being by weight unless otherwise stated.

EXAMPLE 1

A fine dispersion in 390 parts of o-dichlorobenzene of 68.1 parts of the dye obtained by coupling diazotised 1-amino-2-methyl-3-chlorobenzene with 2,3-oxynaphtoic acid is heated to 85° C. Over the course of 15 minutes 32.7 parts of thionyl chloride are added dropwise with stirring. The reaction mixture is subsequently heated and held for 90 minutes at 115°–120° C. After the reaction mixture has been cooled to 20° C, the azo dyestuff carboxylic acid which has precipitated in crystalline form is isolated by filtration, washed with a small amount of o-dichlorobenzene and then with benzene and dried in vacuo at 70° C.

With stirring, 36,9 parts of the above carboxylic acid chloride are heated with 650 parts of o-dichlorobenzene to 110° C. A warm (120° C) solution containing 7.9 parts of 1,5-diaminonaphthalene in 195 parts of o-dichlorobenzene is added to this suspension over the course of 2–3 minutes. The mixture is stirred for 16 hours at 140°–145° C. The resultant condensation product is filtered off at 100° C, washed first with warm o-dichlorobenzene (100° C), then with methanol of 20° C and dried in vacuo at 100° C. The resultant dye of the formula

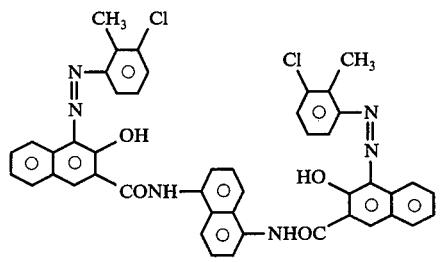

constitutes a red powder of very sparing solubility in the organic solvent. When finely dispersed, it colours polyvinyl chloride sheets in strong red shades of very good fastness to migration and light.

EXAMPLE 2

A pigment with similar properties is obtained by carrying out the procedure of Example 1 but using 2,5-dichloroaniline as diazo component.

EXAMPLE 3

0.6 g of the pigment manufactured according to Example 1, 67 g of polyvinyl chloride, 33 g of dioctyl phthalate, 2 g of dibutyl tin laurate and 2 g of titanium dioxide are mixed together and processed to a thin sheet in a roll mill for 15 minutes at 160° C. The resultant red colouration is strong and fast to migration, heat and light.

EXAMPLE 4

10 g of titanium dioxide and 2 g of the pigment manufactured according to Example 1 are ground for 38 hours in a hall mill with 88 g of a mixture of coconut alkyd resin, 24.0 g of melamine formaldehyde resin (50% solids content), 8.8 g of ethylene glycol monomethyl ether and 28.8 g of xylene.

This lacquer is sprayed on an aluminium sheet, pre-dried for 30 minutes at room temperature and then stoved for 30 minutes at 120° C to give a red lacquering which is characterised by good strength and very good fastness to overlacquering, light and weathering.

I claim:
1. The disazo pigment of the formula

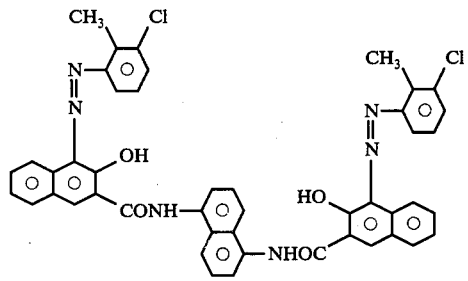

* * * * *